(12) United States Patent  (10) Patent No.: US 7,697,158 B2
Jansen et al.  (45) Date of Patent: Apr. 13, 2010

(54) METHOD FOR PRINTING A DIGITAL PRINT FILE AND A PRINTER ADAPTED FOR APPLYING THE SAID METHOD

(75) Inventors: Marten Jansen, Nijmegen (NL); Bas J. J. Van Loon, Nuenen (NL); Henricus W. H. M. Kessels, Roermond (NL); Lambertus A. H. Van Vonderen, Venray (NL)

(73) Assignee: Oce-Technologies B.V., Venlo (NL)

( * ) Notice: Subject to any disclaimer, the term of this patent is extended or adjusted under 35 U.S.C. 154(b) by 1293 days.

(21) Appl. No.: 11/190,944

(22) Filed: Jul. 28, 2005

(65) Prior Publication Data

US 2006/0023256 A1  Feb. 2, 2006

(30) Foreign Application Priority Data

Jul. 29, 2004  (EP) .................................. 04077182

(51) Int. Cl.
  *G06F 15/00* (2006.01)
  *G06K 1/00* (2006.01)
(52) U.S. Cl. .................... 358/1.16; 358/1.14; 358/1.15; 358/1.13; 358/1.9; 399/80
(58) Field of Classification Search ................ 358/1.15, 358/1.11–1, 14, 1.16–1.18; 399/80, 81
  See application file for complete search history.

(56) References Cited

U.S. PATENT DOCUMENTS 6,181,893 B1 * 1/2001 Collard et al. ................ 399/80

| 6,307,640 | B1 | 10/2001 | Motegi | |
| 2001/0038462 | A1* | 11/2001 | Teeuwen et al. | 358/1.15 |
| 2003/0231329 | A1 | 12/2003 | Edmonds et al. | |
| 2004/0021893 | A1 | 2/2004 | Stevens et al. | |
| 2006/0227363 | A1* | 10/2006 | Ogura | 358/1.15 |

FOREIGN PATENT DOCUMENTS

EP  1 229 724 A2  7/2002

* cited by examiner

*Primary Examiner*—Twyler L Haskins
*Assistant Examiner*—Satwant K Singh
(74) *Attorney, Agent, or Firm*—Birch, Stewart, Kolasch & Birch, LLP

(57) ABSTRACT

The present invention pertains to a method for printing a digital print file using a system comprising a digital network which interconnects a plurality of service units, for example a plurality of printers, and a print file memory. The method includes submitting a print job comprising the print file via a workstation to the network, upon which the system sends information corresponding to the print job to a default service unit, and stores the print file in the memory while linking the print file to a user, selecting a service unit different from the default service unit to print the print file, the selected service unit not having information corresponding to the print job, receiving data corresponding to the user, which is entered by an operator at a user interface of the selected service unit, identifying the user by the system using the data, after which the system retrieves the print file linked to the identified user from the memory, and sends the retrieved print file to the selected service unit, and printing the print file by the selected service unit.

20 Claims, 5 Drawing Sheets

METHOD FOR PRINTING A DIGITAL PRINT FILE AND A PRINTER ADAPTED FOR APPLYING THE SAID METHOD

This application claims the benefit of the European Patent Application No. 04077182.6 filed on Jul. 29, 2004, which is hereby incorporated by reference.

BACKGROUND OF THE INVENTION

1. Field of the Invention

The present invention pertains to a method for printing a digital print file using a system comprising a digital network which interconnects a plurality of service units, for example a plurality of printers, and a print file memory.

2. Discussion of the Background Art

A general method for printing a digital print file is known from European Patent Application EP 1 229 724. In this known method, a print job, i.e. the specified order to make a document, is submitted by a user to the digital network via a workstation, e.g. a personal computer. The print job comprises the print file itself, i.e. the data corresponding to the information that should be printed in the document, as well as metadata such as the name of the print file, the user that submits the job, and jobticket information, e.g. specifying the type of receiving material to be used, whether or not the document should be double-sided, etc.

Upon submitting the job, the system sends information corresponding to the print job, in particular the metadata, to each of the printers connected to the network, and stores the print file and information linking the job to a user in the memory. In an embodiment disclosed in EP 1 229 724, the memory is present on a print server. The metadata is used to create a mailbox in each of the printers, which mailbox is dedicated to the user corresponding to the submitted job. This way, a user can access his print jobs at each of the printers, simply by opening the mailbox corresponding to his name, also called his personal mailbox. After opening his mailbox and selecting one or more of the jobs to be printed, the system retrieves the corresponding print files from the memory and sends them to the local memory of the printer. The print files are then automatically printed, in accordance with the jobticket information. The advantage of this method over other known mailbox systems is that jobs can be accessed via any printer that is part of the system, and not only via a default printer.

The method as disclosed in EP 1 229 724, however, has an important disadvantage, in particular for systems which are constituted for many users. Since upon submitting of a job a dedicated mailbox is created in each of the printers, the number of mailboxes can increase significantly in each of those printers. When a user wants to open his mailbox in such a case, he has to run through a long list of personal mailboxes in order to access his mailbox. This can be very time consuming, prone to making mistakes, and annoying to users, in particular when alphanumerical logically sequenced codes are used to identify each of the users corresponding to respective mailboxes.

SUMMARY OF THE INVENTION

An object of the present invention is to mitigate these and other disadvantages of the background art. For this, a method according to the present invention has been devised. In this method, after submitting a print job the system sends information corresponding to the print job to a (or optionally more than one) default service unit, and stores the print file and information linking the job to a user in the memory. This default service unit is for example a printer which is normally used for printing the jobs of the user that has submitted the job. The information sent to this printer is for example metadata about the submitted job. This way, the default service unit knows about the job being submitted. This information can e.g. be used to create a dedicated mailbox in the default printer, or, in case there is already created a mailbox corresponding to the same user, to correctly store the information about the print job in this mailbox.

In the method according to an aspect of the present invention, it is made possible that a service unit different from the default service unit can be selected to print the print file. Since the selected non-default service unit does not have the information corresponding to the print job (e.g. job name, username, etc.), there is no link at this service unit which can be selected to directly access the print file. Therefore, data corresponding to the user (i.e. uniquely pertaining to this user) needs to be put in by an operator (e.g. the user himself) at a user interface of the selected service unit. This data enables the system, for example using a controller located in the service unit itself, to identify the user. Identification of the user on its turn, enables automatic checking whether there is any print file that is linked to the identified user anywhere in the memory of the system, and if so, to retrieve that print file from the memory and bring it over to the selected service unit. After arrival of the print file, this file can be printed by the selected service unit.

Using the method according to the present invention, mailbox lists at each of the printers can be relatively short because dedicated mailboxes at a certain printer need only be created for those users for which that printer is a default printer. Still, any user can use any printer that is part of the system to print his jobs. When a non-default printer is selected to print the job, the user is simply identified at the printer, which enables the system to go and check whether there are any print jobs submitted for this user to any of the other printers. For this, the memory and/or default service unit(s) for that user could be checked. Although the actual access to a particular job at a non-default printer requires the additional step of identifying the corresponding user, one of major advantages of the present invention is that any job can be accessed via any service unit of the system, without all service units needing to present information that provides direct access to print jobs.

In an embodiment of the invention, the memory comprises a set of logical storage spaces for digital print files, each of the storage spaces dedicated to a respective user of the system. This embodiment has an advantage that the memory is organized in order to enable a quick and adequate access to print files stored in the memory. In a further embodiment, the retrieval of the print file comprises accessing the logical storage space of the identified user and addressing the print file in the logical storage space. In this embodiment, retrieval of print files corresponding to a certain user starts off with searching for a logical storage space dedicated for this user. If such a space is present in the memory, the contents are addressed, i.e. selected to be taken out of the memory or duplicated to another, optional volatile, memory location.

In an embodiment, the default service unit is a printer. In particular when the default service unit is a printer, the advantages of the present invention are pronounced. Often, many operators/users are standing in line to have their files printed. The method according to the invention helps to shorten the time for accessing the right print files. This mitigates the problem(s) commonly faced with printers. In a further embodiment, the memory is provided in this default printer. In this embodiment, the default printer not only holds information corresponding to the print job, in particular metadata corresponding to this job, but also holds the memory in which the print file is actually stored. In other words, the print file is stored locally at the default printer. It may be evident that the system itself has memory capacity additional to the actual memory space in which the print file is stored. This additional capacity may be distributed over the system, for example over all service units (printers, servers, multifunctionals, etc.) that are part of the system. In a particular embodiment, the memory is provided in a print server. In this embodiment the print file itself is not locally stored in a printer, but is stored in the memory of a print server. Access from a non-default printer is less time-consuming and less prone to retrieval problems.

In an embodiment, after the system has identified the user, but before the print file is printed, the name of the user is displayed at the user interface. This embodiment enables the operator to check whether the user identified by the system indeed is the user intended by him. This way, false identification, for example because the operator has put in the wrong data, can be recognized by the operator. In a further embodiment the print file is not printed until the operator confirms the identification of the user. By demanding a confirmation of the operator, a convenient way for preventing printing of non intended print files is provided for.

In an embodiment of the invention, the data corresponding to the user is alphanumerical code or biometrical data. Although common types of identification using RFID, magnetic cards, chipcards, or identification via bluetooth or infrared can be used in the present invention, it appears that alphanumerical code is convenient for identification of a user and since most printers or other service units are provided with an alphanumerical keyboard. Another type of data which conveniently enables identification is biometrical data such as data pertaining to a user's fingerprint, voice patterns, retinal patterns, scent patterns, iris-scan, quetelet index, etc. This embodiment in general needs the user himself to operate the service unit, since the biometrical data are in general unique to the user and cannot be easily copied into a dummy.

According to an aspect of the invention, there is provided a method for printing a digital print file using a system comprising a digital network which interconnects a plurality of service units, and a print file memory, the method comprising: submitting a print job comprising the print file via a workstation to the network, upon which the system sends information corresponding to the print job to a default service unit, and stores the print file in the memory while linking the print file to a user; selecting a service unit different from the default service unit to print the print file, the selected service unit not having information corresponding to the print job; receiving data corresponding to the user, which is entered by an operator at a user interface of the selected service unit; identifying the user by the system using the data, after which the system retrieves the print file linked to the identified user from the memory, and sends the received print file to the selected service unit; and printing the print file by the selected service unit.

Apart from the present method, the invention also pertains to a system for printing a digital print file, the system comprising: a print file memory; a workstation for submitting a print job comprising the print file to a digital network, the system being devised such that upon submitting, information corresponding to the print job is sent to a default service unit, and the print file and information linking the job to a user is stored in the memory; a service unit different from the default service unit, and not having information corresponding to the print job, and having a user interface enabling an operator to enter data corresponding to the user; and a manager being devised for identifying the user by using the data, thereby enabling retrieval of the print file linked to the corresponding user from the memory and sending the retrieved print file to the service unit different from the default service unit for printing of the print file by that service unit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE DRAWINGS

The invention will be exemplified by specific embodiments with reference to the following figures.

DETAILED DESCRIPTION OF THE PREFERRED EMBODIMENTS

FIG. 1

Figure 1:
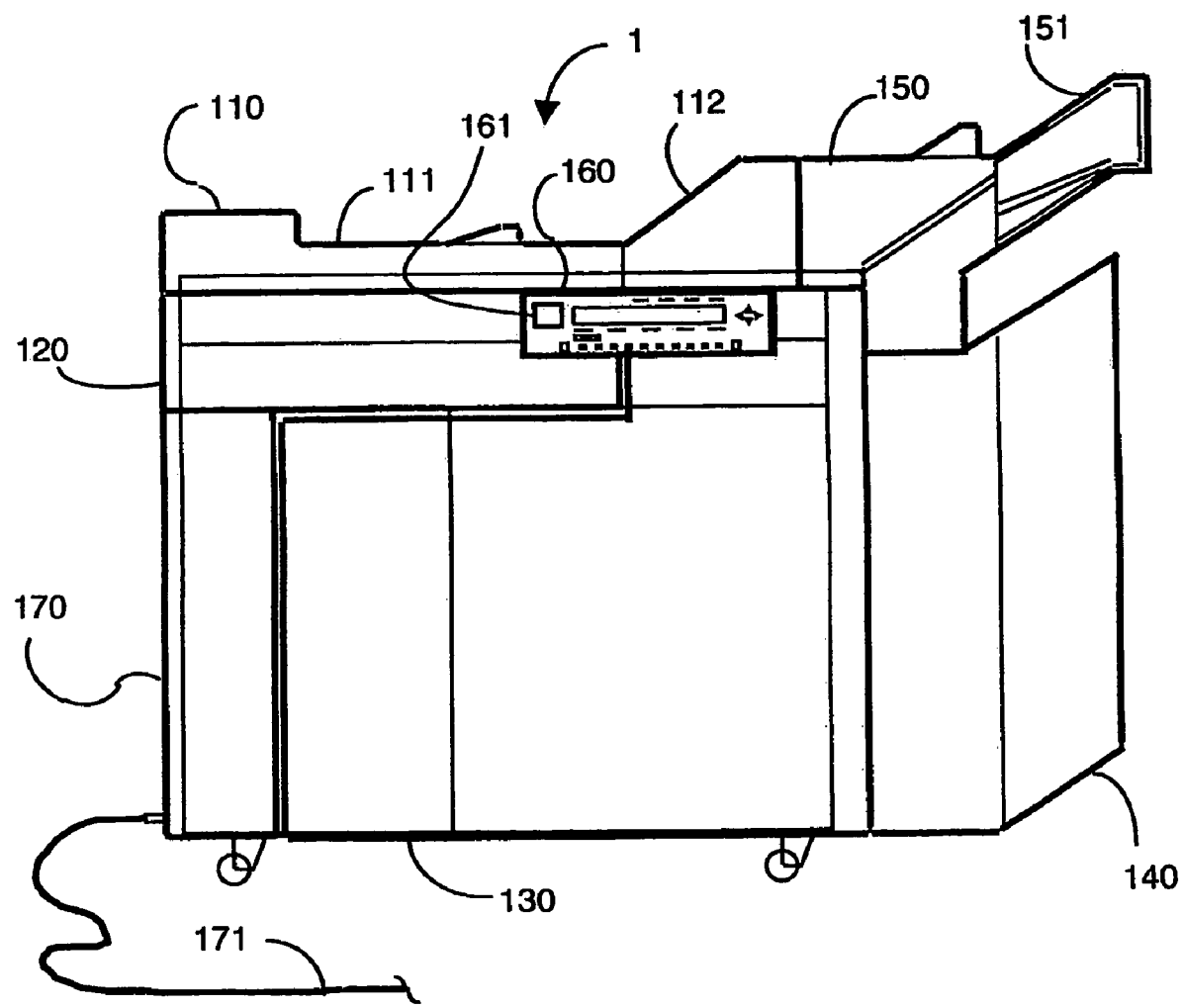
FIG. 1 shows an apparatus for processing documents according to an embodiment of the present invention.

FIG. 1 shows an apparatus 1 for processing documents, in this embodiment being a printer. The different parts of the printer are separately shown in diagram form. The documents are usually paper documents, but may include any type of sheets for carrying information, e.g. overhead sheets, books, drawings, etc.

The apparatus 1 has a printer unit 130 which includes an electro-photographic processing section known in which a photoconductive medium is charged, exposed via an LED array in accordance with digital image data, and is developed with toner powder, whereafter the toner image is transferred and fixed on an image support, usually a sheet of paper. A stock of image supports in different formats and orientations is available in a supply section 140. The image supports with the toner image are transported to a finishing and delivery section 150, which if necessary collects them into sets and staples them and then deposits them in a delivery tray 151. All the components of the apparatus 1 are operatively coupled.

The apparatus 1 for processing documents may be a printer only, but preferably is a multi-functional device further including scanning, copying or faxing functions, e.g. a versatile copier. A document feeder 110 is provided with an input tray 111 for the introduction of a stack of documents, a transport mechanism (not shown) for transporting the documents one by one along a scanner unit 120, and a delivery tray 112 in which the documents are placed after scanning. The scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals which are converted into digital image data in a known manner.

Figure 2:
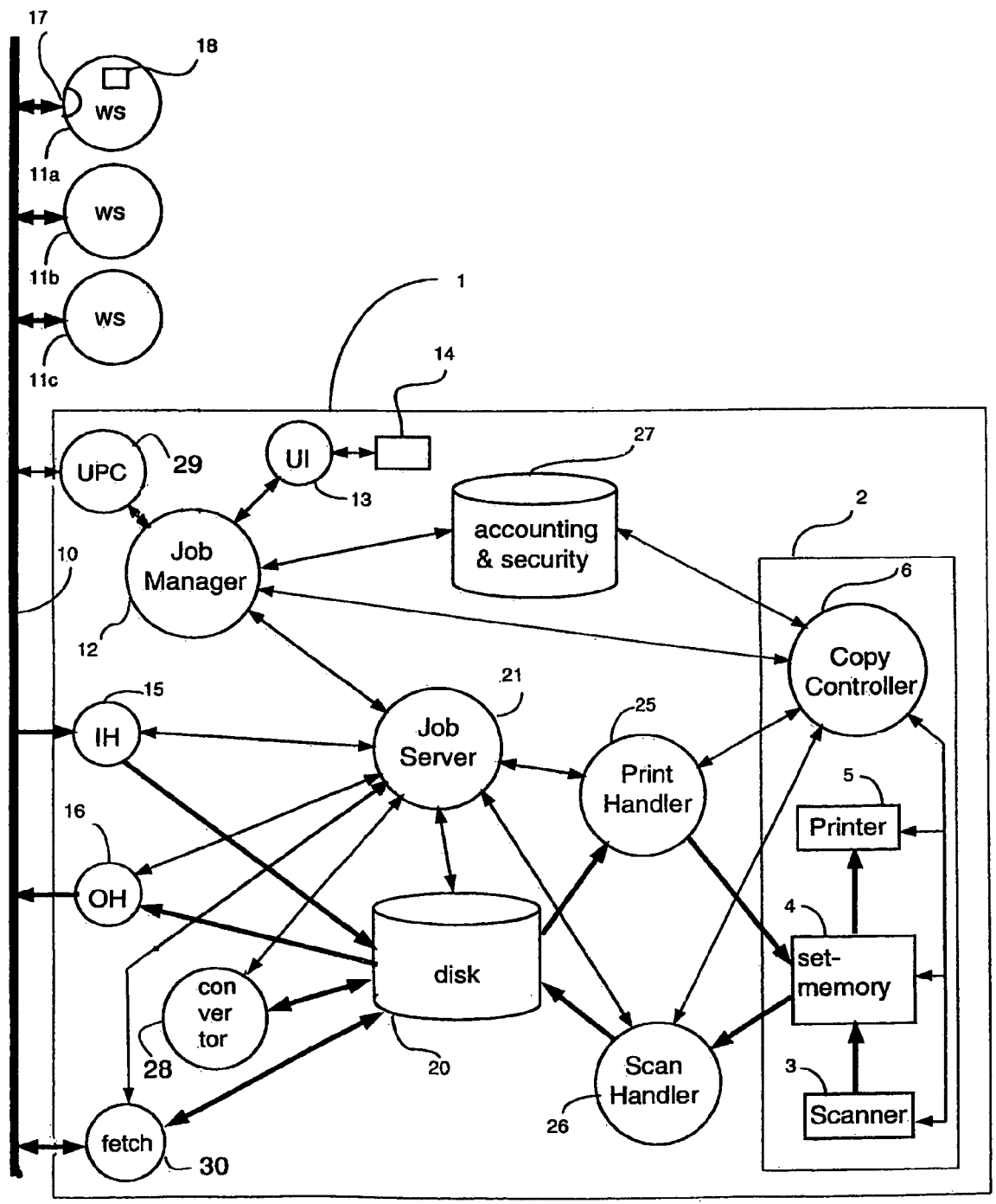
FIG. 2 shows a diagram of the constituent parts of the document processing apparatus of FIG. 1 in a networked system according to an embodiment of the present invention.

The control unit of the apparatus is shown diagrammatically by reference 170, and explained in more detail in sub-units 12, 20, 21, 25, 26, 27, 28 with reference to FIG. 2. A cable 171 may connect the control unit 170 via a network unit 15,16 to a local network 10 (shown in FIG. 2). The network 10 may be wired, but may also be partly or completely wireless.

The apparatus 1 has a user interface, for example including an operator control panel 160 provided on the apparatus for operation thereof. The user interface may be provided with a display and keys. In a specific embodiment the user interface has a fingerprint unit 161 which is sensitive to applying a fingerprint of a user, and provides an electronic signal representing the patterns constituting the fingerprint. The fingerprint unit and ways of deriving an electronic fingerprint pattern are known as such. Using the fingerprint unit, an operator can provide the apparatus with data pertaining to his fingerprint for identification purposes.

FIG. 2

FIG. 2 shows a diagram of the constituent parts of the document processing apparatus 1 in a networked system. In FIG. 2 control connections are indicated by means of thin arrows and data transport connections are indicated by means of thick arrows. The apparatus 1, a multi-functional copier/printer, comprises a basic unit 2 which contains a scanner unit 3, a printer unit 5, a set memory 4 and a control unit 6 for these units. The control unit 6 is hereinafter termed as the CopyController. The basic unit 2 contains the units and functions required for making a simple copy. During the scanning of an original document, the scanner 3 generates digital image data and stores them in the set memory 4, whereafter the printer 5 reads out the image data from the set memory 4 and prints them on an image support, usually a sheet of paper. This process is controlled by the CopyController 6. The set memory 4 in this description may also include image processing functions, although this is not essential to the present invention and is therefore not explained further.

The apparatus 1 also includes a number of units required to print digital image data which are fed via a local network 10 from a network environment, and for exporting digital image data generated by the scanner 3 to the network environment via the same local network 10. The network system or environment as used here includes one or more workstations 11a, 11b, 11c, on which a program is operative for communication with the printer, and which are also connected to the local network 10. In addition one or more server stations (also simply called "servers") may be coupled to the networked system, and provide central services, such as storing user data or access rights.

The apparatus 1 is provided with a management unit 12, hereinafter referred to as the JobManager, which manages the document processing processes and also updates an administration system for all the copying, scanning and print jobs present. Next to this, the apparatus 1 is provided with a user interface UI 13 provided with an operator control panel on the apparatus housing, with a display and keys for operation of the apparatus 1, and a fingerprint unit 14 for entering user fingerprints. Further the apparatus 1 has a network unit including an InputHandler 15 for receiving and transmitting digital data reaching the apparatus via the network 10 from the network environment and an OutputHandler 16 for sending digital data via the network 10 to the digital environment.

The JobManager 12 is logically connected to the workstations 11a-11c indicated diagrammatically by direct broken-line arrows.

The apparatus 1 may have a storage unit 20 formed by a high-capacity hard disk, a unit 21 hereinafter referred to as a JobServer for managing the data files on the storage unit 20 and for controlling the processing processes. The electronic control of the apparatus 1 may further include a control unit 25 hereinafter referred to as a PrintHandler, which is dedicated to controlling a printing process, a control unit 26 hereinafter referred to as a ScanHandler, which is dedicated to controlling a scanning process, an accounting and security unit 27, which inter alia manages the authorization of users and access codes, and a conversion unit 28 for converting digital data files to different formats. Note that these functions may also be centrally accommodated in a server station.

The networked system provides a dynamic set of logical storage spaces assigned to owners for storing document processing items such as print jobs or scan jobs. The logical storage space for a user, also called a mailbox, provides a temporary storage for his jobs. Note that the jobs may be deleted after execution, or may be maintained for later use. The logical storage space may be accommodated in the apparatus, e.g. by the JobManager 12 and physically storing the jobs on the storage unit 20, or may be accommodated elsewhere in the system, e.g. on a server station. The logical storage space in this embodiment is a data space that is temporarily assigned to a user as long as there are jobs to be stored for that user, e.g. print jobs sent to a specific printer. As soon as all jobs have been executed and/or removed, the mailbox is deleted.

The workstation 11a has a network unit 17 for communicating via the network 10 for connecting the workstation to the digital document processing apparatus 1. Further the workstation 11a has a control unit 18 for creating a print job related to a digital document at the workstation. Digital data files which are sent to the apparatus 1 via the network 10 for printing may be of a direct printing type, i.e. jobs to be printed without further action on the part of an operator at the apparatus. Preferably jobs are of a controlled processing type, which are entered via the networked system into the logical storage space of the user and not executed until an operator request at the apparatus. The type of job is determined at the workstation of the user, and is apparent from an attribute added to the data transferred. Handling of controlled processing jobs, and accommodating the logical storage spaces for users, is extensively described in the document U.S. Pat. No. 6,555,769.

The apparatus 1 also includes a printing client (UPC) 29 connected between the JobManager 12 and the network 10 for communicating with the printing server (UPS). Further, it includes a fetch module 30 for fetching a print data file from the print data storage function, which might be located in another printer or the server (UPS). Fetching the data takes place via the network 10, under the control of the JobServer 21. The administration system for jobs is maintained by the JobManager 12.

FIG. 3

Figure 3:
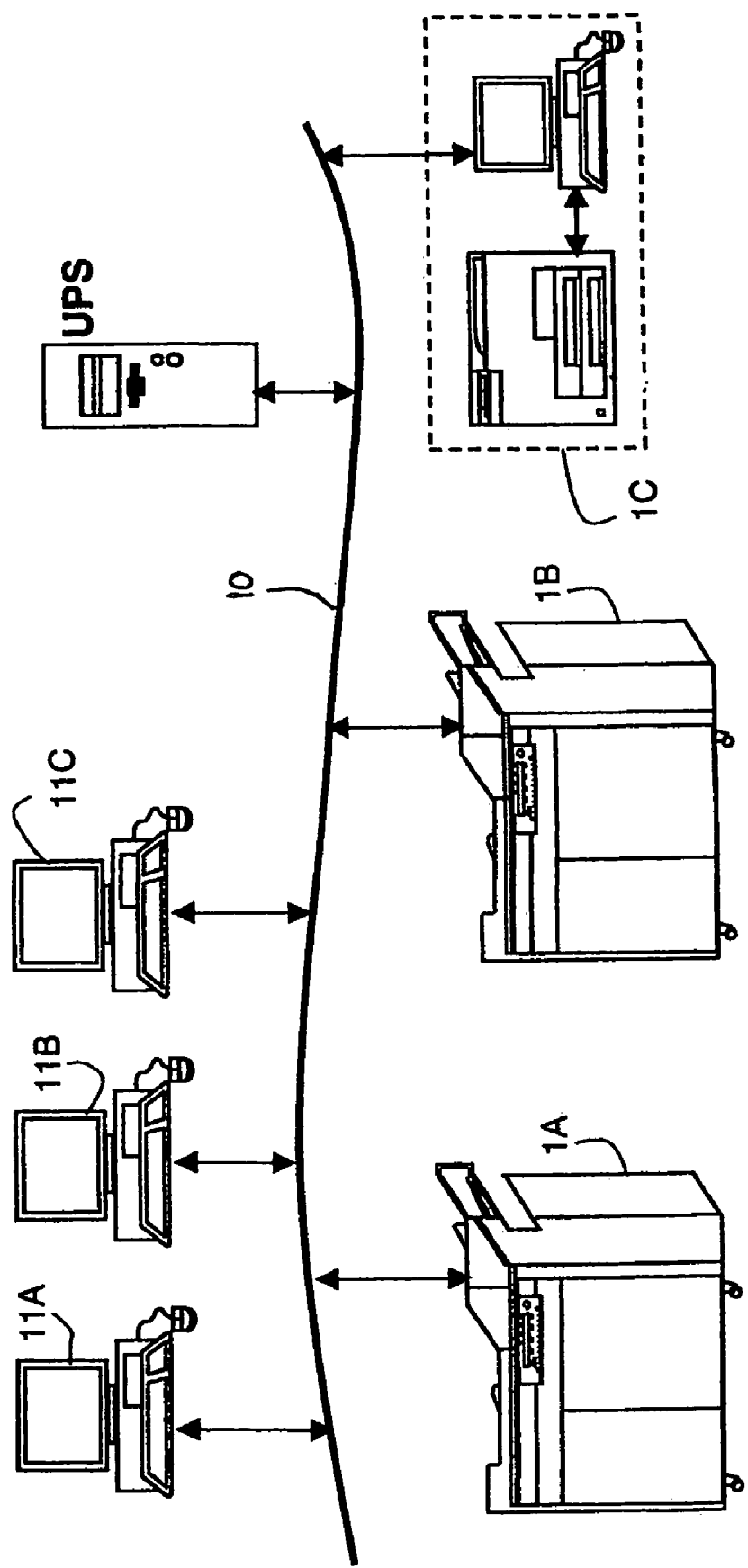
FIG. 3 is a general outline of a system according to the invention.

FIG. 3 represents a general outline of a system according to the present invention, including a plurality of workstations 11A, 11B, 11C and printers 1A, 1B, 1C, and a Printing Server UPS, all connected to the network 10. All the components of the system are operatively coupled. The workstations 11A-11C can be the workstations 11a-11c of FIG. 2. In a first implementation, the UPS performs both the server function and a print file storage function. The UPS may be a PC having a high capacity hard disk. The UPS receives and stores all print files. The metadata corresponding to each print file is sent to the default printer(s) of each respective user. In operation, the printers include the jobs, i.e. at least the metadata corresponding to these jobs, in their administration systems and make them selectable for printing. For this, they present a list of dedicated mailboxes at their respective user interfaces, from which an operator of a printer can select a mailbox for printing the print files corresponding to the user of this mailbox. In this embodiment the printers have not stored the actual print data (print file) on their disks. When a user selects a job at the user interface of one of the printers, the latter downloads the print data from the UPS and prints the job.

In a second implementation, of which the hardware is similar to that of the first implementation, print files are submitted to a default printer, at the choice of the user (or as programmed in his printer driver). Upon reception of the print file, the addressed printer stores the file internally, extracts the job metadata and sends them to the UPS, which fulfills the rest of the server function. The other (non-default) printers do not include the jobs in their administration systems. Therefore, these jobs are not selectable per se for printing. However, the method and system according to the present invention do provide for access to these jobs from a non-default printer. For this, the user corresponding to such a job is identified at the user interface of the printer, after which the non-default printer, via the network 10, searches the memory location in the remote default printer for information corresponding to the print jobs submitted for that user. In an embodiment, if this information is found, the metadata corresponding to the jobs is sent to the non-default printer. The user can then select a job at the user interface of the non-default printer using a presentation of the metadata, for example a list of jobnames, at this interface. After selection of this job, the corresponding print file is retrieved from the memory and sent to the same non-default printer for printing. In an alternative embodiment, if the information is found initially, the print jobs are retrieved as a whole (i.e. metadata and print files) from the memory and sent to the non-default printer. After that, the user can select one or more of these jobs at the non-default printer for actual printing.

In an embodiment, the server function and the print data storage function are fully distributed. Therefore, a physical server device is not needed. Where, in any of these implementations, data are sent to a plurality of printer devices, it would be advantageous to do so by "multicasting". In multicasting, data are entered on the network only once. Analogous to radio and TV the devices tuned to the right 'Multicast' channel fetch the data from the network. This method of distributing data results in a lower network loading.

FIG. 4

Figure 4:
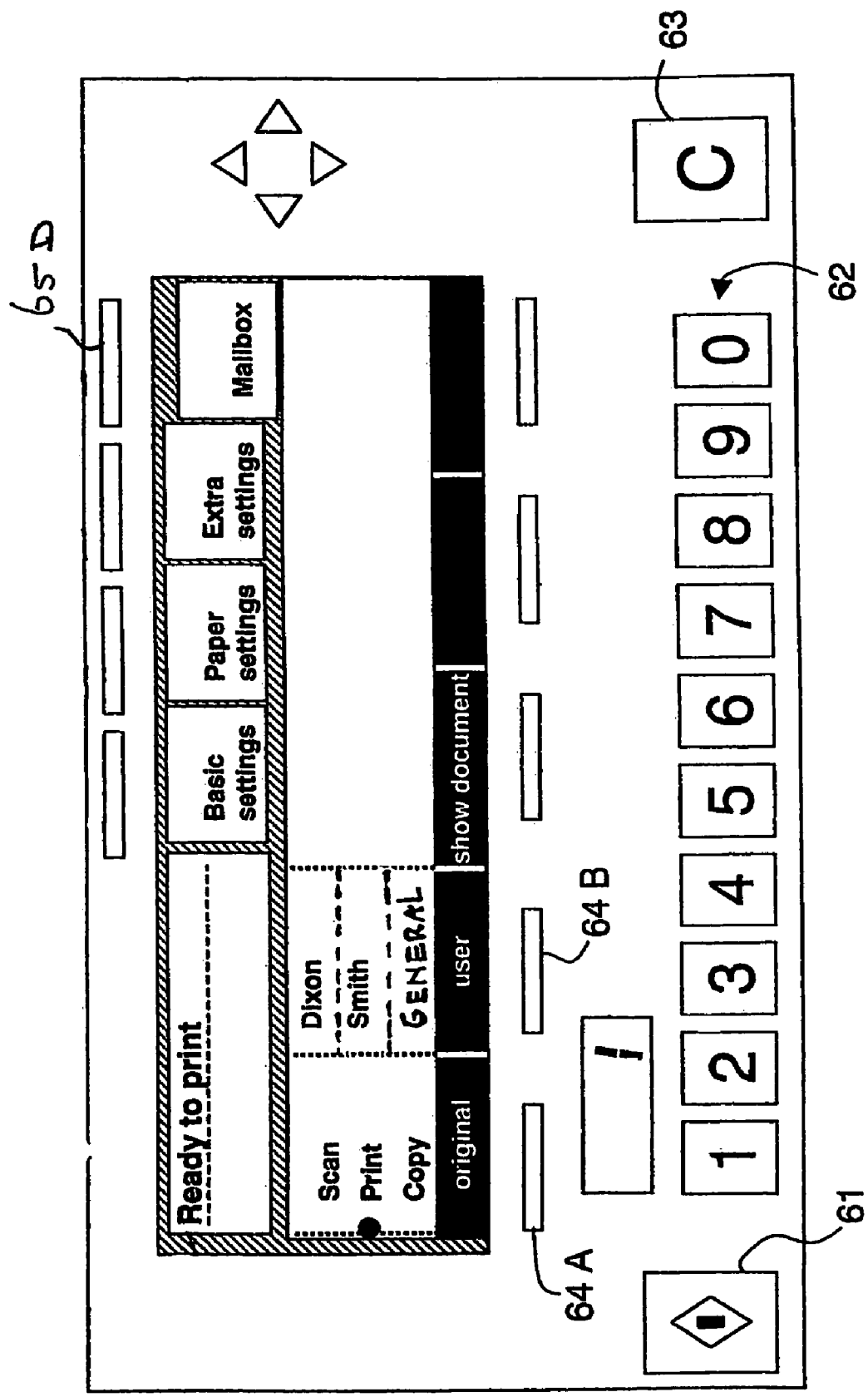
FIG. 4 illustrates an operator control panel of the apparatus of FIG. 1 according to an embodiment of the present invention.

FIG. 4 illustrates an example of an operator control panel of the apparatus of FIG. 1, without showing the finger print unit 161. Here-beneath the course of events is given when a user gives a print order with the aid of the operator control means on the apparatus control panel, in this case the control panel of a non-default printer for that particular user.

First, the print function is selected with key 64A, or alternatively, this function is selected by pressing key 65 D. The operator control unit 13 then passes a request to the JobManager 12 to pass a list of all the active user names (names of users having at least one print job submitted for this printer). In response to that request, the JobManager makes up a current list and passes it to the operator control unit 13.

The operator control unit displays the user list on the display, in the column above key 64B. In this particular case, it appears that users <Dixon> and <Smith> have submitted at least one job for this printer, being their default printer (at least for these jobs).

This printer however is a non-default printer for the present user <Doe>, so he cannot select his name out of the list. In addition to the active users however, the display image however also shows the selectable "name"<General>. For enabling printing of his print files, the user Doe selects <General>.

Then, the JobManager sends a message to be displayed at the user interface, asking the operator to put in data corresponding to the user which print files should be printed. In this embodiment, the operator uses keys 62 to enter a code uniquely corresponding to user <Doe>. By using an enter key 61, user <Doe> actually enters the code. The JobManager then accesses the Accounting & Security unit 27 to find the user corresponding to the entered code. If a user is found, it is displayed at the user interface 13. If the operator has typed the right code, the right name will be displayed. Confirmation is required by pressing key 61. If the wrong code was typed, a wrong name or even <no user> (if the code does not correspond to any user) will be displayed. After pressing correction key 63, a new code can be input by the operator.

Confirmation will lead to the fetch module 30 to go and check the other memory location(s) of the system, to see whether there are print files stored for the identified user. If so, these files are retrieved from that memory location(s). Also the metadata and other information of the print job are retrieved via network line 10. Then, the JobManager makes up a current list of print jobs of the current user and passes it through to the operator control unit 13, which displays this list to the user for selection on a display. The process of selecting and ultimately printing one or more of the print jobs is elaborately described in the European Patent Application EP 1 229 724, in particular in paragraphs [0152] to [0171], and is adopted to the present invention.

FIG. 5

Figure 5:
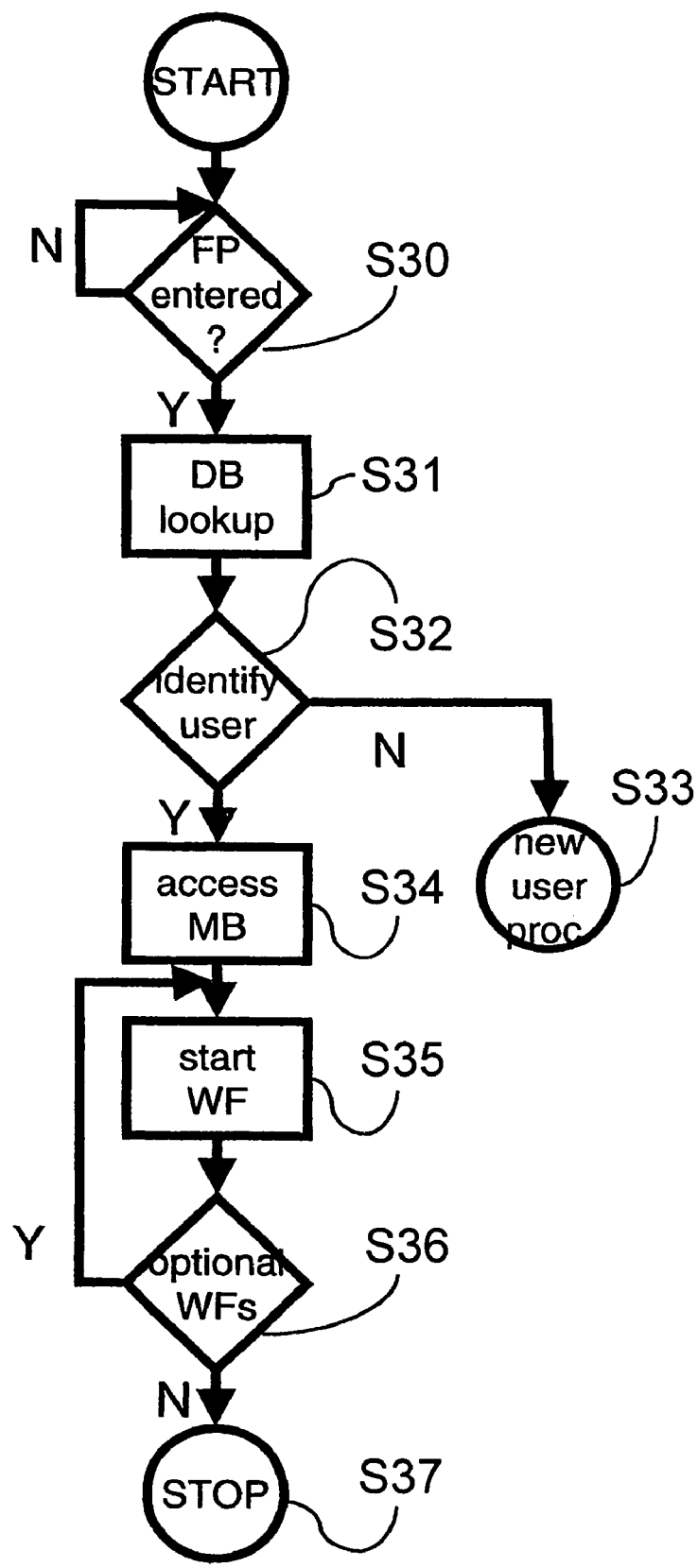
FIG. 5 shows a method of controlling document processing in the networked system according to an embodiment of the present invention.

FIG. 5 shows a general method of controlling document processing in a networked system in accordance with an alternative embodiment of the present invention. The networked system in itself has been described above with reference to FIGS. 2 and 3. This embodiment is an alternative for the inputting of numerical data corresponding to a certain user for identifying purposes as described here-before, and can be implemented in the networked system discussed above.

The method of FIG. 5 has the following steps. In a first step S30 entry of a fingerprint on a fingerprint unit of the user interface of the apparatus for document processing is awaited. Subsequently, in response to a fingerprint from the user at the fingerprint input unit, in step S31 the fingerprint pattern is matched to user fingerprint data available in a user database. Note that the actual fingerprint pattern may first be converted into a set of parameter values, and that in actual fact these data are further used. In step S32 it is decided if the user can be identified based on the fingerprint entered and the fingerprint data available. If no identification is possible, the user may be a new user and a dedicated new user routine S33 may be started.

Assuming the user has been identified in step S32, subsequently in step S34 the respective logical storage space (mailbox) of the user is accessed. Next, in step S35 a document processing workflow is initiated related to the accessed logical storage space. In particular the contents of the logical storage space are addressed, jobs are retrieved from the logical storage spaced, sent to the present printer and executed according to workflow settings for the respective jobs. For example a print job may be executed according to print settings as attributed to the print jobs. The newest print job may be automatically started as soon as the mailbox is opened. Note that the user may use different fingers having different preferences, e.g. an index finger for a default workflow that automatically prints a single copy of all pending (not yet printed) print jobs, and a middle finger for a workflow that does not automatically print but only opens the mailbox. As part of the workflow the user may have the option to further select another workflow via the user interface in step S36. Finally, as indicated by step S37, when the user has finished his jobs, he may actively terminate the workflow.

Before starting the workflow at the document processing device, the user may create a print job related to a digital document other jobs at his workstation. The job includes a user identification, which user identification corresponds to entries in the user database connected to fingerprint data of a fingerprint to be entered at the digital document processing apparatus. For example the user identification may be a unique number, or a digital signature. Note that the user database contains a corresponding unique number or decoding key for linking the user identification attached to a job to the user data including the fingerprint data. Normally, the user identification is automatically included in the print job in the printer driver of the workstation, or in a print manager software program. The fingerprint data may be retrieved from the Windows registry (in a user specific folder of the registry). A registration process may be triggered if no fingerprint data is available. Subsequent to the creation, the print job is transferred to one of the logical storage spaces via the network. Note that as a default the jobs will be stored in the logical storage space of the user at a selected or default document processing device, but alternatively the user may select to transfer the job to the logical storage space of a different owner, e.g. his secretary.

It may be evident for the skilled practitioner that a network in the sense of the present invention may also comprise wireless connections. Next to this, a user in the sense of this invention may also be a fictitious person representing a group of actual users.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for printing a digital print file using a system comprising a digital network which interconnects a plurality of service units, and a print file memory, the method comprising:

submitting a print job by a user comprising the print file via a workstation to the network, upon which the system sends information corresponding to the print job to a default service unit, and stores the print file in the memory while linking the print file to a user;

selecting a service unit different from said default service unit to print said print file, the selected service unit not having information corresponding to the print job;

automatically showing a list at a user interface of the selected service unit, said list including names of users who have at least one print job submitted to the service unit and an additional item;

selecting the additional item; and in response to selection of the additional item, automatically displaying a request at the user interface of the selected service unit for putting in data corresponding to the user;

receiving data corresponding to the user, which is entered by an operator at a user interface of the selected service unit;

identifying the user by the system using said data, after which the system retrieves the print file linked to the identified user from the memory, and sends the retrieved print file to the selected service unit; and printing the print file by the selected service unit.

2. A method according to claim 1, wherein the memory comprises a set of logical storage spaces for digital print files, each of the storage spaces dedicated to a respective user of the system.

3. A method according to claim 2, wherein the retrieval of the print file comprises accessing the logical storage space of the identified user and addressing said print file in the logical storage space.

4. A method according to claim 1, wherein said default service unit is a printer.

5. A method according to claim 4, wherein the memory is provided in the default printer.

6. A method according to claim 1, wherein the memory is provided in a print server.

7. A method according to claim 1, wherein the information corresponding to the print job is metadata specifying information about the print job.

8. A method according to claim 7, wherein the metadata includes a name of the print file and the user linked to the print job.

9. A method according to claim 1, wherein after the system has identified the user, but before the print file is printed, a name of the user is displayed at the user interface.

10. A method according to claim 9, wherein the print file is not printed until the operator confirms the identification of the user.

11. A method according to claim 1, wherein the data corresponding to the user is either an alphanumerical code or biometrical data.

12. A method according to claim 1, wherein the service units are a plurality of printers.

13. A system for printing a digital print file, the system comprising:

a print file memory;

a workstation for submitting a print job comprising the print file to a digital network, the system being devised such that upon submitting, information corresponding to the print job is sent to a personal default service unit, and the print file and information linking the job to a user is stored in the memory;

a service unit different from said default service unit, and not having information corresponding to the print job, and having a user interface adapted to show a selection list including names of users who have sent at least one print job to that service unit and an additional item, and when an operator has selected the additional item, to request the operator to enter data corresponding to the user; and a manager being devised for identifying the user by using said data and retrieval of the print file linked to the corresponding user from the memory and sending the retrieved print file to said service unit different from the personal default service unit for printing of the print file by that service unit.

14. A system according to claim 13, wherein the memory comprises a set of logical storage spaces for digital print files, each of the storage spaces dedicated to a respective user of the system.

15. A system according to claim 14, wherein the retrieval of the print file comprises accessing the logical storage space of the identified user and addressing said print file in the logical storage space.

16. A system according to claim 13, wherein said default service unit is a printer.

17. A system according to claim 13, wherein the memory is provided in a print server.

18. A system according to claim 13, wherein the information corresponding to the print job is metadata specifying information about the print job.

19. A system according to claim 18, wherein the metadata includes a name of the print file and the user linked to the print job.

20. A system according to claim 13, wherein the data corresponding to the user is either an alphanumerical code or biometrical data.

\* \* \* \* \*